US011257270B2

(12) United States Patent
Yu et al.

(10) Patent No.: US 11,257,270 B2
(45) Date of Patent: Feb. 22, 2022

(54) GENERATION OF DYNAMIC PICTURE SEQUENCE

(71) Applicant: Beijing Sankuai Online Technology Co., Ltd, Beijing (CN)

(72) Inventors: Li Yu, Beijing (CN); Xin Jin, Beijing (CN)

(73) Assignee: Beijing Sankuai Online Technology Co., Ltd, Beijing (CN)

( * ) Notice: Subject to any disclaimer, the term of this patent is extended or adjusted under 35 U.S.C. 154(b) by 0 days.

(21) Appl. No.: 17/048,603

(22) PCT Filed: Dec. 19, 2018

(86) PCT No.: PCT/CN2018/121948
§ 371 (c)(1),
(2) Date: Oct. 18, 2020

(87) PCT Pub. No.: WO2019/214240
PCT Pub. Date: Nov. 14, 2019

(65) Prior Publication Data
US 2021/0150795 A1    May 20, 2021

(30) Foreign Application Priority Data
May 8, 2018    (CN) .......................... 201810433574.6

(51) Int. Cl.
*G06T 13/80*    (2011.01)
*G06N 3/04*    (2006.01)
*G06N 3/08*    (2006.01)

(52) U.S. Cl.
CPC .......... *G06T 13/80* (2013.01); *G06N 3/0445* (2013.01); *G06N 3/0454* (2013.01); *G06N 3/088* (2013.01)

(58) Field of Classification Search
CPC .......... G06T 7/11; G06T 7/194; G06T 7/593; G06T 7/596; G06T 2207/20084;
(Continued)

(56) References Cited

U.S. PATENT DOCUMENTS 5,960,111 A * 9/1999 Chen ........................ G06K 9/34
                                                      382/173
6,526,168 B1 * 2/2003 Ornes ................... G06K 9/6253
                                                      382/158
(Continued)

FOREIGN PATENT DOCUMENTS

CN    102368196 A    3/2012
CN    103716536 A    4/2014
(Continued)

OTHER PUBLICATIONS

European Patent Office, Extended European Search Report Issued in Application No. 18917768.6, dated May 12, 2021, Germany, 7 pages.
(Continued)

*Primary Examiner* — Abderrahim Merouan
(74) *Attorney, Agent, or Firm* — Kilpatrick Townsend & Stockton, LLP

(57) ABSTRACT

Methods and apparatuses for generating a dynamic picture sequence are provided. The method includes generating a target vector from a target static picture; obtaining a foreground dynamic picture sequence, a foreground mask dynamic picture sequence and a background static picture by performing a prediction on the target vector; obtaining N frames of foreground static pictures by splitting the foreground dynamic picture sequence; obtaining N frames of foreground mask static pictures by splitting the foreground mask dynamic picture sequence; generating a first frame of static image by performing a prediction with inputting a first frame of the foreground static pictures, a first frame of the (Continued)

foreground mask static pictures and the background static picture into a first cell body of a Long Short-Term Memory network.

18 Claims, 4 Drawing Sheets

(58) Field of Classification Search
CPC ...... G06T 7/20; G06K 9/4604; G06K 9/6262; G06K 9/4628; G06K 9/34; G06N 3/08; G06N 3/0454; G06N 3/084; G06N 3/082; H04N 19/20
See application file for complete search history.

(56) References Cited

U.S. PATENT DOCUMENTS

| | | | |
|---|---|---|---|
| 7,536,049 B2 * | 5/2009 | Kondo | G06T 7/20 345/619 |
| 11,024,037 B2 * | 6/2021 | Du | G06T 7/11 |
| 11,080,532 B2 * | 8/2021 | Chuang | G06K 9/00355 |
| 2012/0057775 A1 * | 3/2012 | Suzuki | H04N 5/781 382/154 |
| 2017/0278135 A1 | 9/2017 | Majumdar et al. | |

FOREIGN PATENT DOCUMENTS

| | | | |
|---|---|---|---|
| CN | 105373768 | A | 3/2016 |
| CN | 106686452 | A | 5/2017 |
| CN | 107172482 | A | 9/2017 |
| CN | 104318596 | B | 10/2017 |
| CN | 108648253 | A | 10/2018 |

OTHER PUBLICATIONS

ISA State Intellectual Property Office of the People's Republic of China. Written Opinion of the International Searching Authority Issued In Application No. PCT/CN2018/121948, dated Mar. 19, 2019, WIPO, 11 pages.

Baoyang Chen et al: "Video Imagination from a Single Image with Transformation Generation", arxiv.org, Cornell University Library, 201 Olin Library Cornell University Ithaca, NY 14853, Jun. 13, 2017, XP080769531, 9 pages.

Spam PI Natoc et al: "VOS-GAN: Adversarial Learning of Visual-Temporal Dynamics for Unsupervised Dense Prediction in Videos", arxiv.org, Cornell University Library, 201 Olin Library Cornell University Ithaca, NY 14853, Mar. 24, 2018, XP080862540, 18 pages.

Yipin Zhou et al: "Image2GIF: Generating Cinemagraphs using Recurrent Deep Q-Networks", arxiv.org, Cornell University Library, 201 Olin Library Cornell University Ithaca, NY 14853, Jan. 27, 2018, XP081210343, 9 pages.

Carl Vondrick et al: "Generating Videos with Scene Dynamics", Sep. 8, 2016, XP055432559, Retrieved from the Internet: URL:https://arciv.org/pdf/1609.02612.pdf, 10 pages.

State Intellectual Property Office of the People's Republic of China, Office Action and Search Report Issued in Application No. 2018104335746, dated Feb. 22, 2019, 9 pages, (Submitted with Machine Translation).

ISA State intellectual Property Office of the People's Republic of China, international Search Report issued in Application No. PCT/CN2018/121948, dated Mar. 19, 2019, WIPO, 4 pages.

* cited by examiner

GENERATION OF DYNAMIC PICTURE SEQUENCE

CROSS-REFERENCE TO RELATED APPLICATIONS

This patent application is a National Stage of International Application No. PCT/CN2018/121948, filed Dec. 19, 2018, which claims priority to Chinese Patent Application No. 201810433574.6 filed on May 8, 2018 and entitled "METHOD AND APPARATUS FOR GENERATING DYNAMIC PICTURE SEQUENCE", the entirety of which is hereby incorporated by reference.

FIELD

The present disclosure relates to the field of network technology, and more particularly to generation of dynamic picture sequence.

BACKGROUND

On a shopping platform, product information may be displayed through static pictures and a dynamic picture sequence. The dynamic picture sequence has better display effect than the static pictures. However, the generation cost of dynamic picture sequence is high.

SUMMARY

A method and an apparatus for generating a dynamic picture sequence are provided in embodiments of the present disclosure to improve accuracy of dynamic picture.

According to a first aspect of the embodiments of the present disclosure, a method of generating a dynamic picture sequence is provided in an embodiment of the present disclosure, including: generating a target vector from a target static picture; obtaining a foreground dynamic picture sequence, a foreground mask dynamic picture sequence and a background static picture by performing a prediction on the target vector with a prediction network; obtaining N frames of foreground static pictures by splitting the foreground dynamic picture sequence frame by frame; obtaining N frames of foreground mask static pictures by splitting the foreground mask dynamic picture sequence frame by frame, and N is a positive integer greater than or equal to 2; generating a first frame of static image by performing a prediction with inputting a first frame of the foreground static pictures, a first frame of the foreground mask static pictures and the background static picture into a first cell body of a Long Short-Term Memory network; generating an Nth frame of static image by performing a prediction with inputting an Nth frame of the foreground static pictures, an Nth frame of the foreground mask static pictures and an (N−1)th frame of static image into an Nth cell body of the Long Short-Term Memory network; and fusing the N frames of the static images sequentially into a dynamic picture sequence corresponding to the target static picture.

According to a second aspect of the embodiments of the present disclosure, an apparatus for generating a dynamic picture sequence is provided, including:

a vector generation device, configured to generate a target vector from a target static picture; a foreground and background prediction device, configured to obtain a foreground dynamic picture sequence, a foreground mask dynamic picture sequence and a background static picture by performing a prediction on the target vector with a prediction network; a splitting device, configured to obtain N frames of foreground static pictures by splitting the foreground dynamic picture sequence frame by frame, and to obtain N frames of foreground mask static pictures by splitting the foreground mask dynamic picture sequence frame by frame, and N is a positive integer greater than or equal to 2; a first dynamic prediction device, configured to generate a first frame of static image by performing a prediction with inputting a first frame of the foreground static pictures, a first frame of the foreground mask static pictures and the background static picture into a first cell body of a Long Short-Term Memory network; an Nth dynamic prediction device, configured to generate an Nth frame of static image by performing a prediction with inputting an Nth frame of the foreground static pictures, an Nth frame of the foreground mask static pictures and an (N−1)th frame of static image into an Nth cell body of the Long Short-Term Memory network; and a synthesis device, configured to fuse the N frames of the static images sequentially into a dynamic picture sequence corresponding to the target static picture. The apparatus for generating a dynamic picture sequence according to an embodiment of the present disclosure uses a processing result of a current frame as a reference for a next frame, which helps to reduce the difficulty of training each network model, and to improve accuracy of image generation.

According to a third aspect of the embodiments of the present disclosure, an electronic device is provided, comprising: a processor, a memory and computer programs stored in the memory and executable on the processor, and when the programs are executed by the processor, the processor is caused to implement the above method of generating a dynamic picture sequence.

According to a fourth aspect of the embodiments of the present disclosure, A readable storage medium is provided, and instructions in the storage medium, when executed by a processor of an electronic device, enable the electronic device to perform the above method of generating a dynamic picture sequence.

A method and an apparatus for generating a dynamic picture sequence are provided in embodiments of the present disclosure, the method includes: generating a target vector from a target static picture; obtaining a foreground dynamic picture sequence, a foreground mask dynamic picture sequence and a background static picture by performing a prediction on the target vector with a prediction network; obtaining N frames of foreground static pictures by splitting the foreground dynamic picture sequence frame by frame; obtaining N frames of foreground mask static pictures by splitting the foreground mask dynamic picture sequence frame by frame, and N is a positive integer greater than or equal to 2; generating a first frame of static image by performing a prediction with inputting a first frame of the foreground static pictures, a first frame of the foreground mask static pictures and the background static picture into a first cell body of a Long Short-Term Memory network; generating an Nth frame of static image by performing a prediction with inputting an Nth frame of the foreground static pictures, an Nth frame of the foreground mask static pictures and an (N−1)th frame of static image into an Nth cell body of the Long Short-Term Memory network; and fusing the N frames of the static images sequentially into a dynamic picture sequence corresponding to the target static picture. The method of generating a dynamic picture sequence according to an embodiment of the present disclosure uses a processing result of a current frame as a reference for a next frame, which helps to reduce the difficulty of training each network model, and to improve accuracy of image generation.

BRIEF DESCRIPTION OF THE DRAWINGS

The accompanying drawings for describing embodiments of the present disclosure are briefly introduced below to explain embodiments of the present disclosure more clearly. It is apparent that the drawings described below merely aim to illustrate some embodiments of the present disclosure.

DETAILED DESCRIPTION

Hereinafter, the technical solutions in the embodiments of the present disclosure will be described clearly and completely with reference to the accompanying drawings in the embodiments of the present disclosure. Apparently, the described embodiments are a part of the embodiments of the present disclosure instead of all of the embodiments.

The inventive patent CN 104318596B proposes a method of generating a dynamic picture sequence, including: firstly, extracting an entity element picture in a static picture by parsing the static picture; then, performing attribute analysis on the entity element picture to determine a motion pattern of the entity from a known repository; and finally, generating a corresponding dynamic picture sequence based on the entity element picture and its first motion pattern.

It can be seen that the motion pattern obtained by the above method is relatively simple, resulting in low accuracy in generating a dynamic picture sequence. In view of the above, a method of generating a dynamic picture sequence is provided in the present disclosure, which is described in detail below with reference to the embodiments.

A First Embodiment

Figure 1:
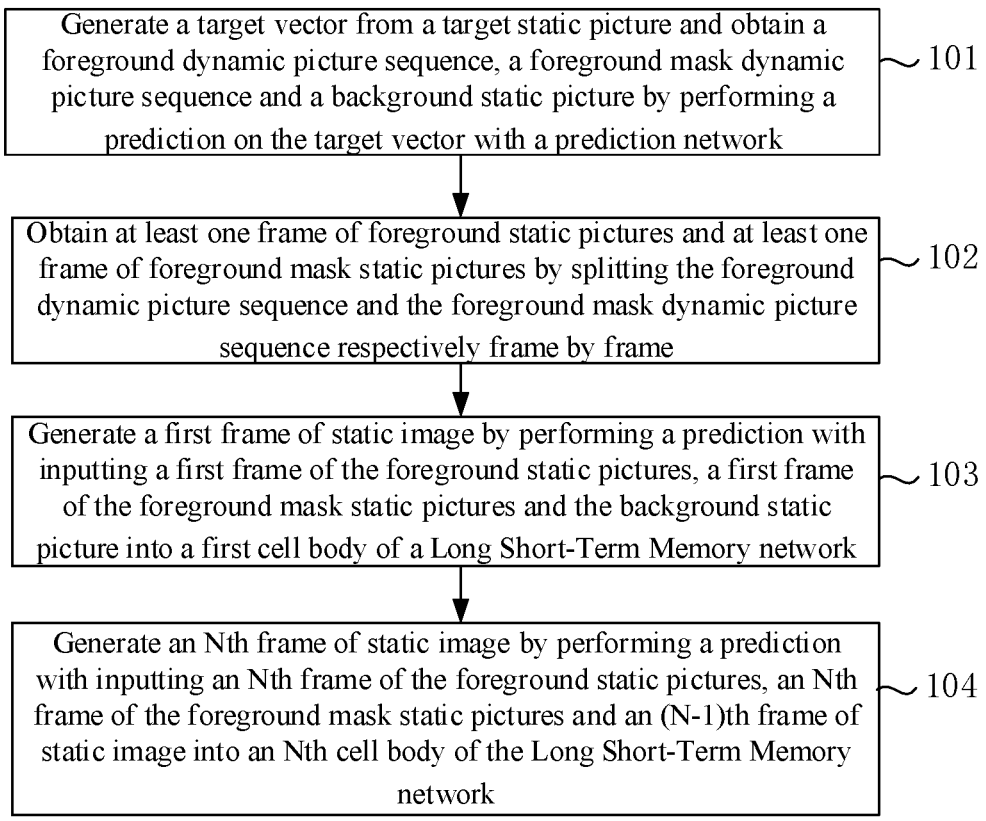
FIG. 1 is a flowchart to illustrate steps of a method of generating dynamic picture sequence in a system architecture according to a first embodiment of the present disclosure.

Referring to FIG. 1, a flowchart illustrating steps of a method of generating a dynamic picture sequence is shown, which can include the following:

At step 101, a target vector may be generated from a target static picture, and a foreground dynamic picture sequence, a foreground mask dynamic picture sequence, and a background static picture may be obtained by performing a prediction on the target vector with a prediction network.

The target vector can be a reference for generating a dynamic picture sequence. The target vector may be a randomly generated noise vector, or a vector obtained from the target static picture, or a vector obtained by splicing the vector obtained from the target static picture and the noise vector.

It can be understood that when the target vector is the noise vector, the generated dynamic picture sequence is not ready to be a reference, and the accuracy of the dynamic picture sequence is low. When the target vector is the vector obtained from the target static picture or a sum vector of the vector obtained from the target static picture and the noise vector, there is a correlation between the generated dynamic picture sequence and the target static picture, and the accuracy of the dynamic picture sequence is high.

The prediction network may include a foreground network and a background network. The foreground network may obtain a foreground dynamic picture sequence and a foreground mask dynamic picture sequence from the target vector, and the background network may obtain a background static picture from the target vector.

The foreground dynamic picture sequence and the foreground mask dynamic picture sequence may contain the same number of frames of static pictures, and an ith frame in the foreground dynamic picture sequence may correspond to an ith frame in the foreground mask dynamic picture sequence.

The ith frame in the foreground dynamic picture sequence and the ith frame in the foreground mask dynamic picture sequence may have the same number of pixels, but only with different pixel values. The pixel value of the ith frame in the foreground mask dynamic picture sequence may be calculated from the pixel value of the ith frame in the foreground dynamic picture sequence.

In an embodiment of the present disclosure, a generation network for generating a dynamic picture sequence may include an encoding network, a prediction network, and a temporal network. The encoding network is configured to generate a one-dimensional vector by performing video encoding on a static picture. The foreground network is configured to obtain a foreground dynamic picture sequence and a foreground mask dynamic picture sequence by performing foreground prediction on the target vector to which the noise vector is spliced. The background network is configured to obtain a background static picture by performing background prediction on the target vector to which the noise vector is spliced. The temporal network is configured to synthesize the foreground dynamic picture sequence, the foreground mask dynamic picture sequence, and the background picture into a final dynamic picture sequence.

At step 102, the foreground dynamic picture sequence may be split into at least one frame of foreground static pictures frame by frame, and the foreground mask dynamic picture sequence may be split into at least one frame of foreground mask static pictures frame by frame.

It can be seen from the detailed description of step 101 that the foreground dynamic picture sequence and the foreground mask dynamic picture sequence may have the same number of frames. Thus, the foreground dynamic picture sequence and the foreground mask dynamic picture sequence may be split into the same number of foreground static pictures and foreground mask static pictures.

In one embodiment, data of different frames may be distinguished based on header information of each frame.

For example, the foreground dynamic picture sequence may be split into N frames of foreground static pictures frame by frame, and the foreground mask dynamic picture sequence may be split into N frames of foreground mask static pictures frame by frame. Where N is a positive integer greater than or equal to 2.

At step 103, a first frame of static image may be generated by performing a prediction with inputting a first frame of the foreground static picture, a first frame of the foreground mask static picture, and the background static picture into a first cell body of a Long Short-Term Memory network.

The temporal network of the present disclosure may use an LSTM (Long Short-Term Memory) model, where inputs are a sequence arranged in chronological order. A LSTM network is a time recursive neural network, and is applicable to handle and predict important events with relatively long intervals and delays. The temporal network model may include a forget gate and an update gate. The coefficients of the forget gate and the update gate are determined from the foreground mask dynamic picture sequence.

It can be understood that if the foreground dynamic picture sequence includes N frames of the foreground static pictures, and that the foreground mask dynamic picture sequence includes N frames of the foreground mask static pictures, the first frame of the foreground static pictures and the first frame of the foreground mask static pictures, a second frame of the foreground static pictures and a second frame of the foreground mask static pictures, . . . , an Nth frame of the foreground static pictures and an Nth frame of the foreground mask static pictures may form a time sequence, and when performing dynamic prediction on each item in the time sequence, the input may include a foreground static picture, a foreground mask static picture, and a static image output by a previous frame.

In practice, since there is no static image output from the previous frame for the first frame of the static images, the static image output from the previous frame is replaced with the background static picture as an input.

At step 104, an Nth frame of the static images may be generated by performing a prediction with inputting the Nth frame of the foreground static pictures, the Nth frame of the foreground mask static pictures, and an (N−1)th frame of the static images of the dynamic picture sequence into an Nth cell body of the Long Short-Term Memory network, where the N frames of static images may be fused sequentially into a dynamic picture sequence corresponding to the target static picture.

It can be understood that after predicting a last frame of the static images of the dynamic picture sequence with a last frame of the foreground static pictures, each frame of the static images may be fused together to form a dynamic picture sequence. For example, for frames of the foreground pictures arranged in chronological order: PJ1, PJ2, . . . , PJN, corresponding static images thereof are PS1, PS2, . . . , PSN, then the obtained dynamic picture sequence is a dynamic picture sequence fused by PS1, PS2, . . . , PSN in the same order.

From the above, a method of generating a dynamic picture sequence is provided in an embodiment of the present disclosure, including: generating a target vector from a target static picture; obtaining a foreground dynamic picture sequence, a foreground mask dynamic picture sequence and a background static picture by performing a prediction on the target vector with a prediction network; obtaining N frames of foreground static pictures by splitting the foreground dynamic picture sequence frame by frame; obtaining N frames of foreground mask static pictures by splitting the foreground mask dynamic picture sequence frame by frame, and N is a positive integer greater than or equal to 2; generating a first frame of static image by performing a prediction with inputting a first frame of the foreground static pictures, a first frame of the foreground mask static pictures and the background static picture into a first cell body of a Long Short-Term Memory network; generating an Nth frame of static image by performing a prediction with inputting an Nth frame of the foreground static pictures, an Nth frame of the foreground mask static pictures and an (N−1)th frame of static image into an Nth cell body of the Long Short-Term Memory network; and fusing the N frames of the static images sequentially into a dynamic picture sequence corresponding to the target static picture. The method of generating a dynamic picture sequence according to an embodiment of the present disclosure uses a processing result of a current frame as a reference for a next frame, which helps to reduce the difficulty of training each network model, and to improve accuracy of image generation.

A Second Embodiment

An embodiment of the present application describes a method of generating a dynamic picture sequence at a level of a system architecture.

Figure 2:
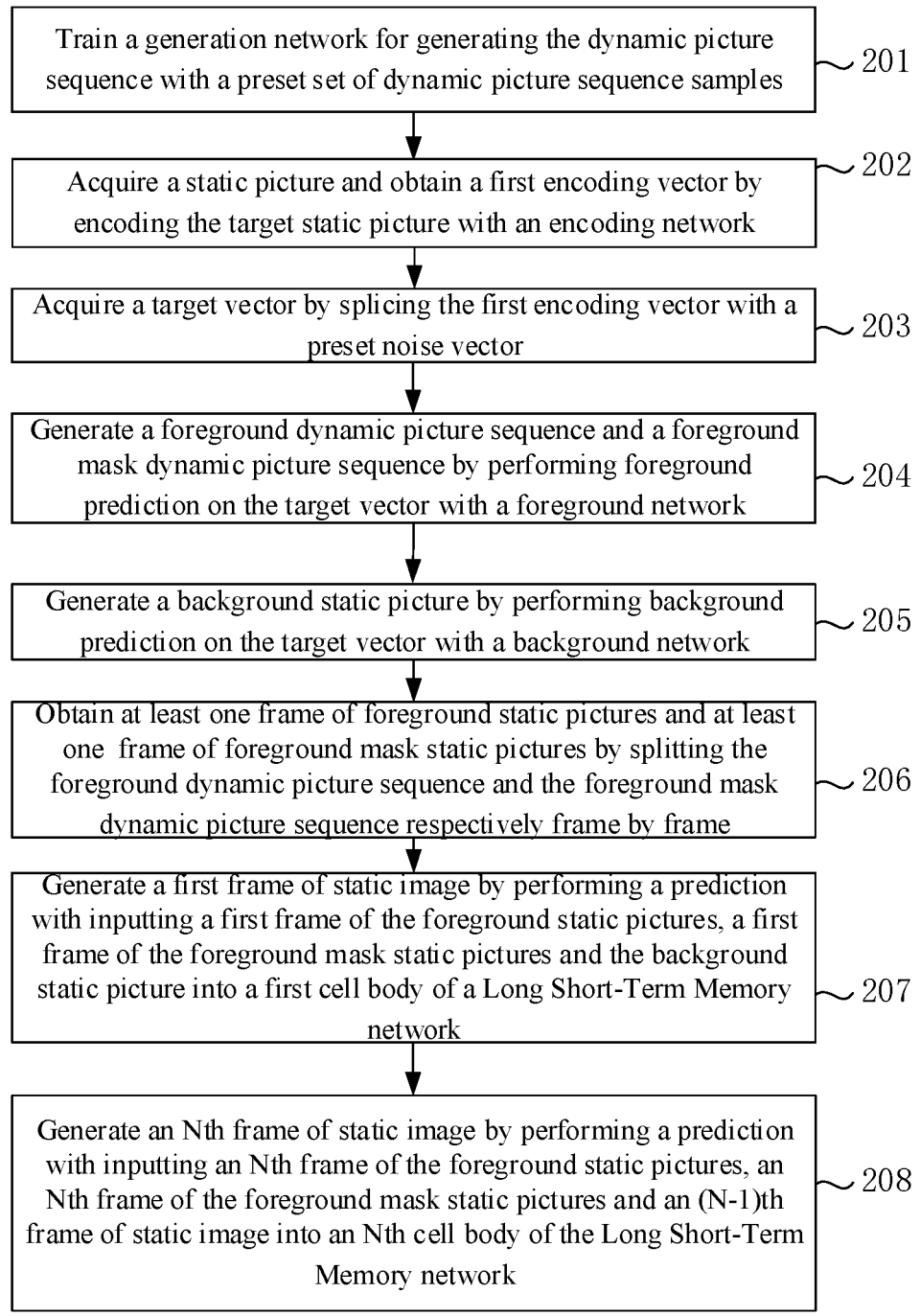
FIG. 2 is a flowchart to illustrate steps of a method of generating dynamic picture sequence in a system architecture according to a second embodiment of the present disclosure.

Referring to FIG. 2, a flowchart of steps of a method of generating a dynamic picture sequence is shown, which can include the following steps 201-208.

At step 201, a generation network for generating a dynamic picture sequence may be trained with a preset dynamic picture sequence samples set.

The dynamic picture sequence samples set may include a large number of dynamic picture sequences, the larger the dynamic picture sequence samples are, the longer the training time will be taken, and the more accurate the training results will be obtained; and the smaller dynamic picture sequence samples are, the shorter the training time will be, and the less accurate the training results will be obtained.

It can be understood that the dynamic picture sequence samples set can be obtained from the internet or other ways. The manner in which the dynamic picture sequence samples set is acquired in the embodiments of the present disclosure is not limited.

As described above, the generation network for generating a dynamic picture sequence may include an encoding network, a prediction network, and a temporal network. First, a simulated dynamic picture sequences set may be generated by a generation network to be trained. Then, the dynamic picture sequence samples set and the simulated dynamic picture sequences set may be mixed together to be discriminated by a discriminant network, and if real pictures cannot be discriminated from unreal pictures, it may indicate that the generated simulated dynamic picture sequences set may be resembling enough to the real ones, and training may be ended, and parameters of the generation network for generating the simulated dynamic picture sequences set may be optimal. If real pictures can be discriminated from unreal pictures easily, it may indicate that the generated simulated dynamic picture sequences set may be not resembling enough to the real ones, and the parameters of the generation network may be adjusted, and the training may be continued.

In one embodiment, step 201 may include:

training a discriminant network by using a preset dynamic picture sequence samples set and a simulated dynamic picture sequences set, where the simulated dynamic picture sequences set may be a set of dynamic picture sequences generated by the generation network;

It can be understood that when a simulated dynamic picture sequences set is generated by the generation network, a target vector may be required to be generated first. To improve training efficiency, a target vector may be generated from a dynamic picture sequence samples set.

First, for each sample dynamic picture sequence in the dynamic picture sequence samples set, one frame of static pictures in the sample dynamic picture sequence is selected as a reference picture. Then, an encoding vector may be obtained by encoding the reference picture. Finally, a target vector is generated by splicing the encoding vector with a randomly generated noise vector.

It is also possible to directly use the noise vector as the target vector, and in this case, the training process is longer than generating the target vector by using the dynamic picture sequence samples set.

Then, the discriminant network may be trained by using the dynamic picture sequence samples set and the simulated dynamic picture sequences set that is generated, samples in the dynamic picture sequence samples set may be labeled as real pictures, and samples in the simulated dynamic picture sequences set may be labeled as unreal pictures. When training the discriminant network, a result of the discriminant network on a sample (i.e. the real picture and the unreal picture) is compared with a label of the sample, and it is required for the discriminant network to correctly discriminate whether the sample is real, and if the result of the discriminant network is undesirable, the parameters of the discriminant network needs to be adjusted.

In the training process of the present disclosure, the discriminant network and the generation network are trained separately and alternatingly, that is, the discriminant network can be trained by adjusting the parameters of the discriminant network, and then each network for generating the dynamic picture sequence can be trained by adjusting the parameters thereof.

The preset dynamic picture sequence samples set and the simulated dynamic picture sequences set may be discriminated by the discriminant network to tell which is real.

In one embodiment, the dynamic picture sequence samples set and the simulated dynamic picture sequences set may be combined into one set in a way each picture in the simulated dynamic picture sequences set is labeled as an unreal picture and each picture in the dynamic picture sequence samples set is labeled as a real picture, and then, whether each picture is real may be determined by the discriminant network.

For each dynamic picture sequence in the dynamic picture sequences set, a second one-dimensional encoding vector corresponding to each frame is obtained by performing image encoding on the frame in the dynamic picture sequence with a convolutional neural network respectively, where the dynamic picture sequences set may include a preset dynamic picture sequence samples set and a simulated dynamic picture sequences set.

Figure 2A:
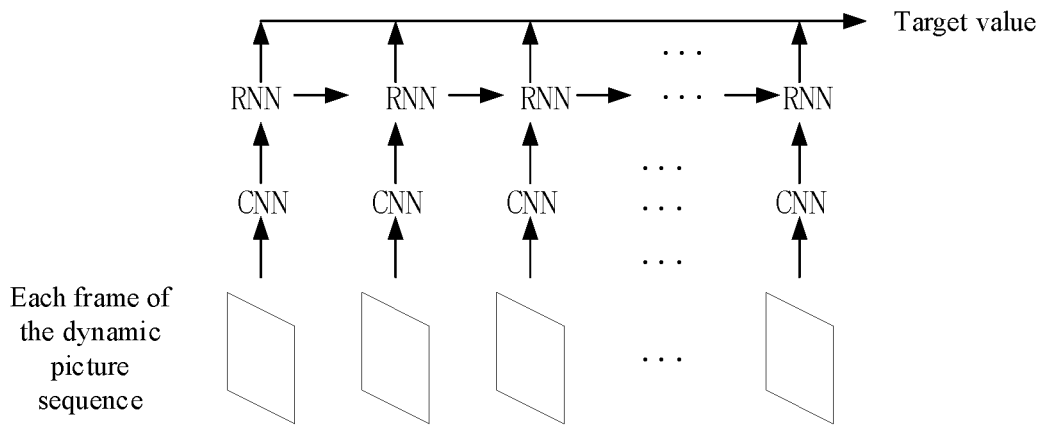
FIG. 2A is a schematic structural diagram of a discriminant network according to an embodiment of the present disclosure.

As shown in FIG. 2A, a two-layer network structure is used for realness discrimination, which is a recurrent neural network (RNN, Recurrent Neural Networks) and a convolutional neural network (CNN, Convolutional Neural Network). An output result of the discriminant network is a value representing whether the dynamic picture sequence is real.

A target value is obtained by performing nonlinear operation on the second encoding vector corresponding to each frame with the recurrent neural network.

In one embodiment, a series of non-linear operations are performed by the recurrent neural network on second encoding vectors through matrix operations. First, a second encoding vector corresponding to a first frame is input into a recurrent neural network for non-linear operation, and a target value is output. Then, a second encoding vector corresponding to each subsequent frame and a target value of a previous frame are input into the recurrent neural network for non-linear operation, and a target value is output. Finally, a target value of a last frame is determined as the target value of the dynamic picture sequence.

A realness discrimination result for the dynamic picture sequence is obtained by performing a determining based on the target value.

As shown in FIG. 2A, the output result of the discriminant network is taken as the target value. When the target value is close to 1, the higher the realness of the dynamic picture sequence is; when the target value is closer to 0, the lower the realness of the dynamic picture sequence is.

If the accuracy of the realness discrimination meets a preset condition, the training is ended.

First, the realness discrimination result is compared with a realness label of the picture, and if the realness discrimination result is consistent with the realness label, it indicates that the discrimination is correct. If the realness discrimination result is inconsistent with the realness label, it indicates the discrimination is wrong. Then, a number of correctly discriminated pictures is counted, and the accuracy of realness discrimination is obtained by calculating the ratio of the number of the correctly discriminated pictures to a total number of pictures. Finally, when the accuracy is about 0.5, it indicates that the generated dynamic picture sequence is resembling enough to the real ones, the accuracy meets a preset condition, and the training is ended, so as to obtain an encoding network for video encoding of a static picture, a foreground network corresponding to the foreground prediction, and a background network corresponding to the background prediction, which form optimal parameters of networks for generating the dynamic picture sequence.

It can be understood that meeting the preset condition may represent that the accuracy is about 0.5, and the specific range of the accuracy in the embodiments of the present disclosure is not limited.

If the accuracy of the realness discrimination does not meet the preset condition, the parameters of the generation network may be adjusted respectively. Then, the training is continued until the accuracy of the realness discrimination meets the preset condition.

It can be understood that parameters of the prediction network, the encoding network, and the Long Short-Term Memory network can be constantly adjusted to perform training repeatedly until the accuracy of realness discrimination meets the preset condition in the embodiments of the present disclosure.

At step 202, a static picture may be acquired, and a first encoding vector may be obtained by encoding the static picture with the encoding network.

The static picture may represent a reference picture for generating a dynamic picture sequence. It may be a picture downloaded from the internet or a picture taken by a user.

The static picture may be encoded as a first encoding vector by gradually changing dimensions. For example, the static picture is a picture of 64*64*3 pixels. Where 64*64 represents pixels of the picture in xy coordinate, and 3 represents a number of color channels of the picture. Then firstly, the static picture is encoded into a form of 32*32*32 matrix, secondly, the 32*32*32 matrix is encoded into a form of 16*16*64 matrix, thirdly the 16*16*64 matrix is encoded into a form of 8*8*128 matrix, and so on, subsequent matrix sizes are sequentially 4*4*256, 2*2*512, 1*1*1024, and the 1*1*1024 is a first encoding vector. It can be understood that the first encoding vector may be considered as a one-dimensional vector.

At step 203, a target vector may be acquired by splicing the first encoding vector with a preset noise vector.

The noise vector may be a one-dimensional vector, and can be randomly generated, and the length thereof can also be set according to an actual application scenario. Lengths and values of noise vectors may vary depending on the application scenario. The embodiments of the present disclosure are not limited thereto.

A first encoding vector and a noise vector in one dimension may be spliced into a target vector in one dimension with a larger length in the embodiments of the present disclosure, where a length of the target vector is a sum of lengths of the first encoding vector and the noise vector. For example, for a first encoding vector [A(1), A(2), . . . , A(L)] of 1*L, and a noise vector [B(1), B(2), . . . , B(M)] of 1*M, the target vector obtained by splicing is [A(1), A(2), . . . , A(L), B(1), B(2), . . . , B(M)].

It can be understood that, in practice, the order of the noise vector and the first encoding vector can be swapped during splicing. For example, for the first encoding vector and the noise vector, the target vector as [B(1), B(2), . . . , B(M), A(1), A(2), . . . , A(L)] is obtained by splicing the first encoding vector following the noise vector.

At step 204, a foreground dynamic picture and a foreground mask dynamic picture may be generated by performing a foreground prediction on the target vector with a foreground network.

The foreground prediction can predict information that changes greatly in a picture, so that the foreground picture may include the subject information that changes constantly.

The foreground mask dynamic picture may be used to control the coefficients of the forget gate and the update gate in the temporal network. It can be understood that the size of the foreground mask dynamic picture is the same as that of the foreground dynamic picture.

The foreground prediction may obtain a foreground dynamic picture through four-dimensional de-convolution, and the foreground dynamic picture is a dynamic picture. Thus, parameters of the foreground prediction may represent various parameters for de-convolution.

For example, in a foreground network, a target vector may be regarded as an initial four-dimensional matrix data, that is, the initial four-dimensional matrix only has data in one dimension, the data represent data of the target vector, and other dimensions are only supplemented for subsequent calculation. The foreground prediction may obtain a foreground dynamic picture by performing several de-convolutions on the initial four-dimensional matrix data, and the foreground dynamic picture may also be regarded as a four-dimensional matrix, where the first two dimensions may represent xy coordinates of the picture, the third dimension may represent a color channel of the picture, and the fourth dimension may represent a number of frames of the picture.

In the embodiments of the present disclosure, the foreground mask dynamic picture may be obtained by transforming the foreground dynamic picture using an activation function. For example, transformation is performed using a sigmoid function, where the sigmoid function is shown in formula (1):

$$y = \frac{1}{1+e^{-x}} \quad (1)$$

where x is a value before transformation, and y is a value after transformation. For the embodiments of the present disclosure, x is a value of data of the four-dimensional matrix of the foreground dynamic picture, and y is a value at a corresponding position in the foreground mask dynamic picture.

At step 205, a background static picture is generated by performing a background prediction on the target vector with a background network.

The background prediction may predict information that changes less in a picture, so that the background picture may include unchanged subject information.

The background prediction may obtain a background static picture through three-dimensional de-convolution, and the background static picture may be a static picture of one frame. Thus, parameters of the background prediction may represent various parameters for de-convolution.

For example, in a background network, a target vector is regarded as an initial three-dimensional matrix data, that is, the initial three-dimensional matrix only has data in one dimension, the data represent data of the target vector, and other dimensions are only supplemented for subsequent calculation. The background prediction may obtain a background static picture by performing several de-convolutions on the three-dimensional matrix data, and the background static picture may also be regarded as a three-dimensional matrix, where the first two dimensions may represent xy coordinates of the picture, and the third dimension may represent a color channel of the picture.

At step 206, at least one frame of foreground static pictures and at least one frame of foreground mask static pictures may be obtained by splitting the foreground dynamic picture and the foreground mask dynamic picture respectively frame by frame.

The step may refer to the detailed description of step 102, and will not be described herein again.

At step 207, a first frame of the static images may be generated by performing a prediction with inputting a first frame of the foreground static pictures, a first frame of the foreground mask static pictures and the background static picture into a first cell body of a Long Short-Term Memory network.

This step may refer to the detailed description of step 103, and will not be described herein again.

At step 208, an Nth frame of the static images is generated by performing a prediction with inputting an Nth frame of the foreground static pictures, an Nth frame of the foreground mask static pictures, and an (N−1)th frame of the static images into an Nth cell body of the Long Short-Term Memory network. The N frames of the static images may be fused sequentially into a dynamic picture sequence corresponding to the target static picture.

This step may refer to the detailed description of step 104, and will not be described herein again.

From the above, a method of generating a dynamic picture sequence is provided in an embodiment of the present disclosure, including: generating a target vector from a target static picture; obtaining a foreground dynamic picture sequence, a foreground mask dynamic picture sequence and a background static picture by performing a prediction on the target vector with a prediction network; obtaining N frames of foreground static pictures by splitting the foreground dynamic picture sequence frame by frame; obtaining N frames of foreground mask static pictures by splitting the foreground mask dynamic picture sequence frame by frame, and N is a positive integer greater than or equal to 2; generating a first frame of static image by performing a prediction with inputting a first frame of the foreground static pictures, a first frame of the foreground mask static pictures and the background static picture into a first cell body of a Long Short-Term Memory network; generating an Nth frame of static image by performing a prediction with inputting an Nth frame of the foreground static pictures, an Nth frame of the foreground mask static pictures and an (N−1)th frame of static image into an Nth cell body of the Long Short-Term Memory network; and fusing the N frames of the static images sequentially into a dynamic picture sequence corresponding to the target static picture. The method of generating a dynamic picture sequence according to an embodiment of the present disclosure uses a processing result of a current frame as a reference for a next frame, which helps to reduce the difficulty of training each network model, and to improve accuracy of image generation. In addition, the optimal parameters for generating a dynamic picture sequence can be obtained through training, so as to flexibly generate dynamic picture sequences and generate simulated dynamic picture sequences from real dynamic picture sequence for training, thus improving training efficiency.

A Third Embodiment

Figure 3:
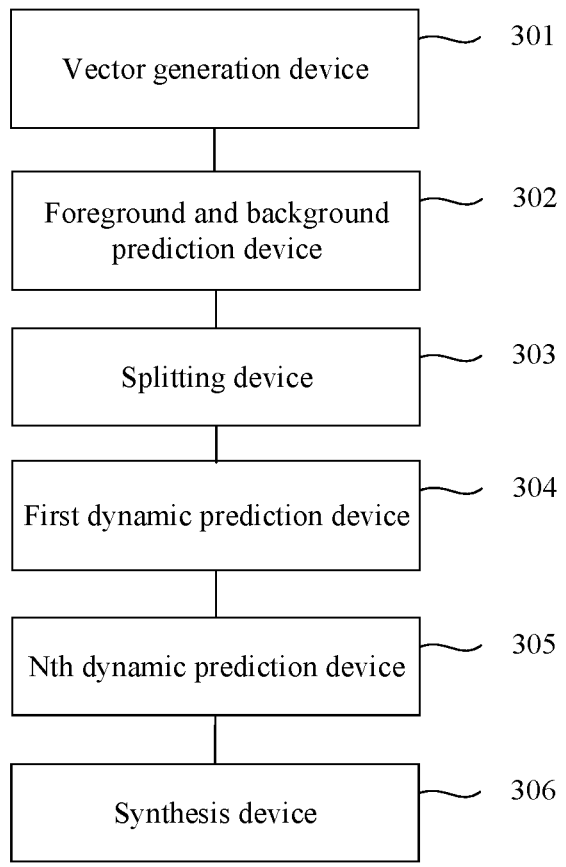
FIG. 3 is a structural diagram of an apparatus for generating dynamic picture sequence according to a third embodiment of the present disclosure.

Referring to FIG. 3, a structural diagram of an apparatus for generating dynamic picture sequence is shown, which can include the following devices:

A vector generation device 301 may be configured to generate a target vector from a target static picture.

A foreground and background prediction device 302 may be configured to obtain a foreground dynamic picture sequence, a foreground mask dynamic picture sequence and a background static picture by performing a prediction on the target vector with a prediction network.

A splitting device 303 may be configured to obtain at least one frame of foreground static pictures by splitting the foreground dynamic picture sequence frame by frame, and to obtain at least one frame of foreground mask static pictures by splitting the foreground mask dynamic picture sequence frame by frame.

A first dynamic prediction device 304 may be configured to generate a first frame of static image by performing a prediction with inputting a first frame of the foreground static pictures, a first frame of the foreground mask static pictures and the background static picture into a first cell body of a Long Short-Term Memory network.

A Nth dynamic prediction device 305 may be configured to generate an Nth frame of static image by performing a prediction with inputting an Nth frame of the foreground static pictures, an Nth frame of the foreground mask static pictures and an (N−1)th frame of static image into an Nth cell body of the Long Short-Term Memory network.

A synthesis device 306 may be configured to fuse the N frames of the static images sequentially into a dynamic picture sequence corresponding to the target static picture.

From the above, an apparatus for generating a dynamic picture sequence is provided in an embodiment of the present disclosure, including: a vector generation device, configured to generate a target vector from a target static picture; a foreground and background prediction device, configured to obtain a foreground dynamic picture sequence, a foreground mask dynamic picture sequence and a background static picture by performing a prediction on the target vector with a prediction network; a splitting device, configured to obtain N frames of foreground static pictures by splitting the foreground dynamic picture sequence frame by frame, and to obtain N frames of foreground mask static pictures by splitting the foreground mask dynamic picture sequence frame by frame, and N is a positive integer greater than or equal to 2; a first dynamic prediction device, configured to generate a first frame of static image by performing a prediction with inputting a first frame of the foreground static pictures, a first frame of the foreground mask static pictures and the background static picture into a first cell body of a Long Short-Term Memory network; an Nth dynamic prediction device, configured to generate an Nth frame of static image by performing a prediction with inputting an Nth frame of the foreground static pictures, an Nth frame of the foreground mask static pictures and an (N−1)th frame of static image into an Nth cell body of the Long Short-Term Memory network; and a synthesis device, configured to fuse the N frames of the static images sequentially into a dynamic picture sequence corresponding to the target static picture. The apparatus for generating a dynamic picture sequence according to an embodiment of the present disclosure uses a processing result of a current frame as a reference for a next frame, which helps to reduce the difficulty of training each network model, and to improve accuracy of image generation.

A Fourth Embodiment

Figure 4:
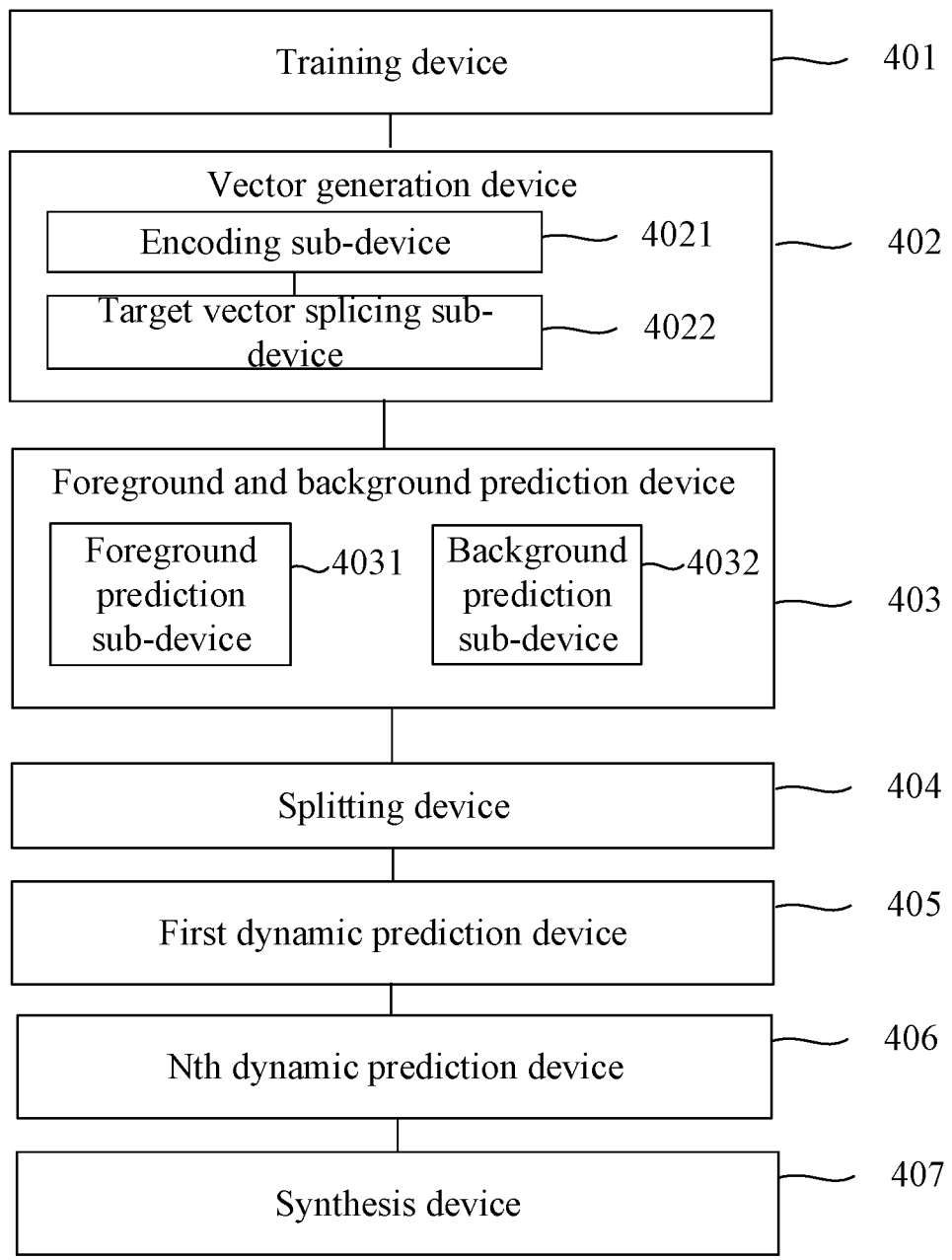
FIG. 4 is a structural diagram of an apparatus for generating dynamic picture sequence according to a fourth embodiment of the present disclosure.

Referring to FIG. 4, a structural diagram of another apparatus for generating dynamic picture sequence is shown, which can include a training device 401, a vector generation device 402, foreground and background prediction device 403, a splitting device 404, a first dynamic prediction device 405, an Nth dynamic prediction device 406, and a synthesis device 407.

The training device 401 may be configured to train a generation network involved in generating the dynamic picture sequence with a preset dynamic picture sequence samples set, and the generation network includes the prediction network, the Long Short-Term Memory network and the encoding network.

The vector generation device 402 may be configured to generate a target vector from a target static picture.

In one embodiment, the vector generation device 402 according to an embodiment of the present disclosure includes:

an encoding sub-device 4021, configured to obtain a target static picture, and to obtain a first encoding vector by encoding the target static picture with an encoding network; and a target vector splicing sub-device 4022, configured to acquire the target vector by splicing the first encoding vector with a preset noise vector.

The foreground and background prediction device 403 may be configured to obtain a foreground dynamic picture sequence, a foreground mask dynamic picture sequence and a background static picture by performing a prediction on the target vector with a prediction network. The foreground and background prediction device 403 may include:

a foreground prediction sub-device 4031, configured to generate the foreground dynamic picture sequence and the foreground mask dynamic picture sequence by performing foreground prediction on the target vector with the foreground network; and a background prediction sub-device 4032, configured to generate the background static picture by performing background prediction on the target vector with the background network.

The splitting device 404 may be configured to obtain at least one frame of foreground static pictures by splitting the foreground dynamic picture sequence frame by frame, and to obtain at least one frame of foreground mask static pictures by splitting the foreground mask dynamic picture sequence frame by frame.

The first dynamic prediction device 405 may be configured to generate a first frame of static image by performing a prediction with inputting a first frame of the foreground static pictures, a first frame of the foreground mask static pictures and the background static picture into a first cell body of a Long Short-Term Memory network.

The Nth dynamic prediction device 406 may be configured to generate an Nth frame of static image by performing a prediction with inputting an Nth frame of the foreground static pictures, an Nth frame of the foreground mask static pictures and an (N−1)th frame of static image into an Nth cell body of the Long Short-Term Memory network.

The synthesis device 407 may be configured to fuse the N frames of the static images sequentially into a dynamic picture sequence corresponding to the target static picture.

In one embodiment, the training device 401 may include:

a discriminant training sub-device, configured to train a discriminant network by using a preset dynamic picture sequence samples set and a simulated dynamic picture sequences set, and the simulated dynamic picture sequences set is a set of dynamic picture sequences generated by the generation network;

a realness discriminant sub-device, configured to perform realness discrimination on the preset dynamic picture sequence samples set and the simulated dynamic picture sequences set with the discriminant network;

a training ending sub-device, configured to end the training if the accuracy of the realness discrimination meets a preset condition; and a training continuing sub-device, configured to adjust parameters of the generation network separately so to continue the training if the accuracy of the realness discrimination does not meet the preset condition.

In one embodiment, the realness discriminant sub-device may include:

a convolutional encoding device, configured to, for each dynamic picture sequence in a dynamic picture sequences set and for each frame of the dynamic picture sequence, obtain a second encoding vector by performing image encoding on the frame with a convolutional neural network, and the dynamic picture sequences set includes the preset dynamic picture sequence samples set and the simulated dynamic picture sequences set;

a nonlinear operation device, configured to obtain a target value by performing a non-linear operation on the second encoding vector corresponding to each frame with a recurrent neural network; and a realness discriminant result device, configured to obtain a realness discrimination result for the dynamic picture sequence by performing a determining based on the target value.

From the above, an apparatus for generating a dynamic picture sequence is provided in an embodiment of the present disclosure. The optimal parameters for generating a dynamic picture sequence can be obtained through training, so as to flexibly generate dynamic picture sequences and generate simulated dynamic picture sequences from real dynamic picture sequence for training, thus improving training efficiency.

An electronic device is provided in an embodiment of the present disclosure, including: a processor, a memory and computer programs stored in the memory and executable on the processor, and when the programs are executed by the processor, the processor is caused to implement the method of generating a dynamic picture sequence according to the above embodiments.

A readable storage medium is provided in an embodiment of the present disclosure, and instructions in the storage medium, when executed by a processor of an electronic device, enable the electronic device to perform the method of generating a dynamic picture sequence according to the above embodiments.

For the apparatus embodiment, since the apparatus is basically similar to the method embodiment, the description is relatively simple, and reference may be made to some of the description of the method embodiment.

The algorithms and displays provided herein are not inherently related to any particular computer, virtual system, or other device. Various general-purpose systems may also be used with the teachings herein based. The structure required to construct such a system is apparent from the above description. Furthermore, embodiments of the present disclosure are also not directed to any particular programming language. It should be understood that the contents of the embodiments of the present disclosure described herein may be implemented with various programming languages, and the description made above for a particular language is for the purpose of disclosing the best embodiment of the embodiments of the present disclosure.

In the description provided herein, numerous specific details are described. It will be appreciated, however, that embodiments of the present disclosure may be practiced without these specific details. In some examples, well-known methods, structures, and techniques are not shown in detail so as not to obscure the understanding of the present description.

Similarly, it should be understood that various features of embodiments of the present disclosure are sometimes grouped together into a single embodiment, figure, or description thereof in the above description of exemplary embodiments of the present disclosure in order to simplify the present disclosure and help understanding one or more of the various inventive aspects. However, the disclosed method should not be construed as reflecting the intention that the claimed embodiments of the present disclosure require more features than are expressly recited in each claim. In one embodiment, as reflected by the claims, the inventive aspect may have fewer features than all features of the individual embodiments disclosed previously. Thus, a claim following a specific implementation is hereby expressly incorporated into the specific implementation, where each claim itself serves as a separate embodiment of the present disclosure.

Embodiments can be adaptively changed and placed in one or more devices different from the embodiment. The devices or components in the embodiments can be combined into one device or component, and furthermore they can be divided into sub-devices or sub-components. In addition to at least some of such features and/or processes or devices being mutually exclusive, all of the features disclosed in this description (including the accompanying claims, abstract and drawings) and all processes or devices of any method or device so disclosed may be combined in any combination. Unless expressly stated otherwise, each feature disclosed in this description (including the accompanying claims, abstract and drawings) may be replaced by an alternative feature that provides the same, equivalent or similar purpose.

Various component embodiments of the present disclosure may be implemented in hardware, or in software devices running on one or more processors, or in combinations thereof. In some embodiments, some or all of the functions of some or all of the components in the device for generating a dynamic picture sequence according to an embodiment of the present disclosure may be implemented using a microprocessor or a digital signal processor (DSP) in practice. Embodiments of the present disclosure may also be implemented as a device or apparatus program for performing part or all of the methods described herein. Such a program implementing embodiments of the present disclosure may be stored on a computer readable medium, or may be in the form of one or more signals. Such a signal may be downloaded from an Internet website, provided on a carrier signal, or provided in any other form.

It should be noted that the above-described embodiments illustrate the embodiments of the present disclosure rather than limiting the embodiments of the present disclosure, and that some embodiments may be designed without departing from the scope of the appended claims. In the claims, any reference symbols located between parentheses should not be construed as limitations to the claims. The word "comprising" does not exclude the presence of elements or steps not listed in the claims. The words "a" or "an" positioned in front of the elements do not exclude the presence of multiple such elements. Embodiments of the present disclosure may be implemented by means of hardware comprising several different elements and by means of a suitably programmed computer. In a device claim enumerating several apparatuses, several of these apparatuses may be embodied by the same hardware item. The use of the words first, second, and third, etc. does not represent any order. These words may be interpreted as names.

In some embodiments, for the convenience and simplicity of description, the specific working processes of the system, apparatus and device described above may refer to corresponding processes in the foregoing method embodiments, and details are not described herein again.

The foregoing description is merely an embodiment of the present disclosure, and is not intended to limit the embodiments of the present disclosure. Any modification, equivalent replacement and improvement made within the spirit and principle of the embodiments of the present disclosure should be included within the scope of protection of the embodiments of the present disclosure.

The invention claimed is:

1. A computer implemented method of generating a dynamic picture sequence, comprising:
   generating a target vector from a target static picture;
   obtaining a foreground dynamic picture sequence, a foreground mask dynamic picture sequence and a background static picture by performing a prediction on the target vector with a prediction network;
   obtaining N frames of foreground static pictures by splitting the foreground dynamic picture sequence frame by frame;
   obtaining N frames of foreground mask static pictures by splitting the foreground mask dynamic picture sequence frame by frame, wherein N is a positive integer greater than or equal to 2;
   generating a first frame of static image by performing a prediction with inputting a first frame of the foreground static pictures, a first frame of the foreground mask static pictures and the background static picture into a first cell body of a Long Short-Term Memory network;
   generating an Nth frame of static image by performing a prediction with inputting an Nth frame of the foreground static pictures, an Nth frame of the foreground mask static pictures and an (N−1)th frame of static image into an Nth cell body of the Long Short-Term Memory network; and
   fusing the N frames of the static images sequentially into a dynamic picture sequence corresponding to the target static picture.

2. The method according to claim 1, wherein generating the target vector comprises:
   obtaining a first encoding vector by encoding the target static picture with an encoding network; and
   acquiring the target vector by splicing the first encoding vector with a preset noise vector.

3. The method according to claim 2, further comprising:
   training a generation network involved in generating the dynamic picture sequence with a preset dynamic picture sequence samples set,
   wherein the generation network comprises the prediction network, the Long Short-Term Memory network and the encoding network.

4. The method according to claim 3, wherein training the generation network involved in generating the dynamic picture sequence with the preset dynamic picture sequence samples set comprises:
   training a discriminant network by using the preset dynamic picture sequence samples and a simulated dynamic picture sequences set, wherein the simulated dynamic picture sequences set is a set of dynamic picture sequences generated by the generation network;
   performing realness discrimination on the preset dynamic picture sequence samples set and the simulated dynamic picture sequences set with the discriminant network;
   ending the training if an accuracy of the realness discrimination meets a preset condition; and
   adjusting parameters of the generation network separately so to continue the training if the accuracy of the realness discrimination does not meet the preset condition.

5. The method according to claim 4, wherein performing realness discrimination on the preset dynamic picture sequence samples set and the simulated dynamic picture sequences set with the discriminant network comprises:
   for each dynamic picture sequence in a dynamic picture sequences set comprising the preset dynamic picture sequence samples set and the simulated dynamic picture sequences set,
   for each frame of the dynamic picture sequence, obtaining a second encoding vector by performing image encoding on the frame with a convolutional neural network;
   obtaining a target value by performing a non-linear operation on the second encoding vector corresponding to each frame with a recurrent neural network; and
   obtaining a realness discrimination result for the dynamic picture sequence by performing a determining based on the target value.

6. The method according to claim 1, wherein
   the prediction network comprises a foreground network and a background network, and
   obtaining a foreground dynamic picture sequence, a foreground mask dynamic picture sequence and a background static picture by performing a prediction on the target vector with the prediction network, comprising:
   generating the foreground dynamic picture sequence and the foreground mask dynamic picture sequence by performing foreground prediction on the target vector with the foreground network; and
   generating the background static picture by performing background prediction on the target vector with the background network.

7. An electronic device, comprising:
a processor, a memory and computer programs stored in the memory and executable on the processor, wherein when the programs are executed by the processor, the processor is caused to perform actions comprising:
generating a target vector from a target static picture;
obtaining a foreground dynamic picture sequence, a foreground mask dynamic picture sequence and a background static picture by performing a prediction on the target vector with a prediction network;
obtaining N frames of foreground static pictures by splitting the foreground dynamic picture sequence frame by frame;
obtaining N frames of foreground mask static pictures by splitting the foreground mask dynamic picture sequence frame by frame, wherein N is a positive integer greater than or equal to 2;
generating a first frame of static image by performing a prediction with inputting a first frame of the foreground static pictures, a first frame of the foreground mask static pictures and the background static picture into a first cell body of a Long Short-Term Memory network;
generating an Nth frame of static image by performing a prediction with inputting an Nth frame of the foreground static pictures, an Nth frame of the foreground mask static pictures and an (N−1)th frame of static image into an Nth cell body of the Long Short-Term Memory network; and
fusing the N frames of the static images sequentially into a dynamic picture sequence corresponding to the target static picture.

8. The electronic device according to claim 7, wherein generating the target vector comprises:
obtaining a first encoding vector by encoding the target static picture with an encoding network; and
acquiring the target vector by splicing the first encoding vector with a preset noise vector.

9. The electronic device according to claim 8, further comprising:
training a generation network involved in generating the dynamic picture sequence with a preset dynamic picture sequence samples set,
wherein the generation network comprises the prediction network, the Long Short-Term Memory network and the encoding network.

10. The electronic device according to claim 9, wherein training the generation network involved in generating the dynamic picture sequence with the preset dynamic picture sequence samples set comprises:
training a discriminant network by using the preset dynamic picture sequence samples and a simulated dynamic picture sequences set, wherein the simulated dynamic picture sequences set is a set of dynamic picture sequences generated by the generation network;
performing realness discrimination on the preset dynamic picture sequence samples set and the simulated dynamic picture sequences set with the discriminant network;
ending the training if an accuracy of the realness discrimination meets a preset condition; and
adjusting parameters of the generation network separately so to continue the training if the accuracy of the realness discrimination does not meet the preset condition.

11. The electronic device according to claim 10, wherein performing realness discrimination on the preset dynamic picture sequence samples set and the simulated dynamic picture sequences set with the discriminant network comprises:
for each dynamic picture sequence in a dynamic picture sequences set comprising the preset dynamic picture sequence samples set and the simulated dynamic picture sequences set,
for each frame of the dynamic picture sequence, obtaining a second encoding vector by performing image encoding on the frame with a convolutional neural network;
obtaining a target value by performing a non-linear operation on the second encoding vector corresponding to each frame with a recurrent neural network; and
obtaining a realness discrimination result for the dynamic picture sequence by performing a determining based on the target value.

12. The electronic device according to claim 7, wherein the prediction network comprises a foreground network and a background network, and
obtaining a foreground dynamic picture sequence, a foreground mask dynamic picture sequence and a background static picture by performing a prediction on the target vector with the prediction network, comprising:
generating the foreground dynamic picture sequence and the foreground mask dynamic picture sequence by performing foreground prediction on the target vector with the foreground network; and
generating the background static picture by performing background prediction on the target vector with the background network.

13. A non-transitory computer readable storage medium, wherein instructions in the storage medium, when executed by a processor of an electronic device, cause the processor to perform actions comprising:
generating a target vector from a target static picture;
obtaining a foreground dynamic picture sequence, a foreground mask dynamic picture sequence and a background static picture by performing a prediction on the target vector with a prediction network;
obtaining N frames of foreground static pictures by splitting the foreground dynamic picture sequence frame by frame;
obtaining N frames of foreground mask static pictures by splitting the foreground mask dynamic picture sequence frame by frame, wherein N is a positive integer greater than or equal to 2;
generating a first frame of static image by performing a prediction with inputting a first frame of the foreground static pictures, a first frame of the foreground mask static pictures and the background static picture into a first cell body of a Long Short-Term Memory network;
generating an Nth frame of static image by performing a prediction with inputting an Nth frame of the foreground static pictures, an Nth frame of the foreground mask static pictures and an (N−1)th frame of static image into an Nth cell body of the Long Short-Term Memory network; and
fusing the N frames of the static images sequentially into a dynamic picture sequence corresponding to the target static picture.

14. The non-transitory computer readable storage medium according to claim 13, wherein generating the target vector comprises:
obtaining a first encoding vector by encoding the target static picture with an encoding network; and
acquiring the target vector by splicing the first encoding vector with a preset noise vector.

15. The non-transitory computer readable storage medium according to claim 14, further comprising:
   training a generation network involved in generating the dynamic picture sequence with a preset dynamic picture sequence samples set,
   wherein the generation network comprises the prediction network, the Long Short-Term Memory network and the encoding network.

16. The non-transitory computer readable storage medium according to claim 15, wherein training the generation network involved in generating the dynamic picture sequence with the preset dynamic picture sequence samples set comprises:
   training a discriminant network by using the preset dynamic picture sequence samples and a simulated dynamic picture sequences set, wherein the simulated dynamic picture sequences set is a set of dynamic picture sequences generated by the generation network;
   performing realness discrimination on the preset dynamic picture sequence samples set and the simulated dynamic picture sequences set with the discriminant network;
   ending the training if an accuracy of the realness discrimination meets a preset condition; and
   adjusting parameters of the generation network separately so to continue the training if the accuracy of the realness discrimination does not meet the preset condition.

17. The non-transitory computer readable storage medium according to claim 16, wherein performing realness discrimination on the preset dynamic picture sequence samples set and the simulated dynamic picture sequences set with the discriminant network comprises:
   for each dynamic picture sequence in a dynamic picture sequences set comprising the preset dynamic picture sequence samples set and the simulated dynamic picture sequences set,
   for each frame of the dynamic picture sequence, obtaining a second encoding vector by performing image encoding on the frame with a convolutional neural network;
   obtaining a target value by performing a non-linear operation on the second encoding vector corresponding to each frame with a recurrent neural network; and
   obtaining a realness discrimination result for the dynamic picture sequence by performing a determining based on the target value.

18. The non-transitory computer readable storage medium according to claim 13, wherein
   the prediction network comprises a foreground network and a background network, and
   obtaining a foreground dynamic picture sequence, a foreground mask dynamic picture sequence and a background static picture by performing a prediction on the target vector with the prediction network, comprising:
   generating the foreground dynamic picture sequence and the foreground mask dynamic picture sequence by performing foreground prediction on the target vector with the foreground network; and
   generating the background static picture by performing background prediction on the target vector with the background network.

* * * * *